United States Patent
MacLaren

(10) Patent No.: US 6,487,621 B1
(45) Date of Patent: Nov. 26, 2002

(54) ARCHITECTURE, SYSTEM AND METHOD FOR ENSURING AN ORDERED TRANSACTION ON AT LEAST ONE OF A PLURALITY OF MULTI-PROCESSOR BUSES THAT EXPERIENCE A HIT-TO-MODIFIED SNOOP CYCLE

(75) Inventor: John M. MacLaren, Cypress, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/375,454

(22) Filed: Aug. 17, 1999

(51) Int. Cl.[7] .......................... G06F 12/00; G06F 13/14
(52) U.S. Cl. ...................... 710/240; 710/107; 710/305; 711/146
(58) Field of Search ................ 710/305–317, 710/107–117, 240–244; 711/146

(56) References Cited

U.S. PATENT DOCUMENTS

| | | | |
|---|---|---|---|
| 5,263,146 A | | 11/1993 | Mishima |
| 5,426,765 A | | 6/1995 | Stevens et al. |
| 5,682,512 A | | 10/1997 | Tetrick |
| 5,682,516 A | | 10/1997 | Sarangdhar et al. |
| 5,778,441 A | | 7/1998 | Rhodehamel et al. |
| 5,787,477 A | | 7/1998 | Rechtschaffen et al. |
| 5,893,151 A | * | 4/1999 | Merchant .................... 711/140 |
| 5,960,457 A | * | 9/1999 | Skrovan et al. ............. 711/146 |
| 6,209,052 B1 | * | 3/2001 | Chin et al. ................... 710/109 |
| 6,247,102 B1 | * | 6/2001 | Chin et al. ................... 711/150 |
| 6,275,885 B1 | * | 8/2001 | Chin et al. ................... 710/128 |
| 6,321,307 B1 | * | 11/2001 | Maguire et al. ............. 711/146 |

* cited by examiner

Primary Examiner—Rupal Dharia
(74) Attorney, Agent, or Firm—Kevin L. Daffer; Conley, Rose & Tayon P.C.

(57) ABSTRACT

An architecture, system and method are provided for efficiently transferring data across multiple processor buses. Cache coherency is maintained among cache storage locations within one or more of those processors, even in instances where a hit-to-modified condition occurs to those cache storage locations. A guaranteed access is maintained to bus agents operating on a first processor bus so that out-of-order or split transactions are prevented on that bus even under conditions of a hit-to-modified condition. One or more of the other processor buses undergo a defer transaction, yielding an out-of-order condition which is resolved after the initial transaction and a snoop request cycle has been placed upon the first processor bus. The present architecture, system and method thereby prevents live-lock conditions, and does so without automatically deferring each transaction yielding a hit-to-modified signal. Moreover, snoop stall operations can also be minimized or avoided on processor buses by not having to employ tag filters and local memory if the costs and latency involved with using such filters is not desired.

19 Claims, 6 Drawing Sheets

ARCHITECTURE, SYSTEM AND METHOD FOR ENSURING AN ORDERED TRANSACTION ON AT LEAST ONE OF A PLURALITY OF MULTI-PROCESSOR BUSES THAT EXPERIENCE A HIT-TO-MODIFIED SNOOP CYCLE

BACKGROUND OF THE INVENTION

1. Field of the Invention

This invention generally relates to an architecture, system and method for maintaining cache coherency and processor consistency within a multi-processor computer system. More particularly, this invention relates to maximizing throughput within multiple processor buses by minimizing snoop stall cycles or out-of-order transactions on at least one of the processor buses.

2. Description of the Related Art

Multi-processor systems are generally well known, whereby a set of processors are interconnected across a local or distributed network. The local network can be confined to a single computer and the distributed network can be one involving, for example, a LAN or WAN. Each processor may either be interconnected with other processors on a single processor bus or connected on its own respective processor bus separate from other processor buses. In the former instance, the processors are said to have been grouped as "clusters." For example, a Pentium® Pro processor bus can support up to four Pentium® Pro processors. Each cluster can thereby be connected to a processor bus and routed to a system memory bus via a system memory controller or bus bridge.

Most modern day processor buses use a pipeline architecture. More specifically, dissimilar stages (or phases) of each transaction can occur with other phases of another transaction so as to service multiple phases of multiple transactions on a singular processor bus. In the Pentium® Pro example, each transaction can employ several phases that can include some or all of the following phases: arbitration phase, request phase, error phase, snoop phase, response phase, and data phase.

During an arbitration phase, the processor bus requesting agent seeks mastership of its respective bus, as granted by an arbiter. A processor is deemed a bus agent and, if multiple processors are arranged in a cluster, arbitration among those processors is granted using, for example, a prioritized or symmetric bus arbitration mechanism. Once a requesting agent is granted ownership or mastership of the bus, a requesting agent will drive an address within a request phase. Provided no errors are discovered for that transaction, as recorded in the error phase, a snoop phase is initiated. In the snoop phase, cache coherency is enforced. Mainly, all bus agents which receive a snoop cycle route a hit or a hit-to-modified signal to the bus agent which requested the snoop cycle. The resulting response of the transaction is then driven during the response phase by the responding bus agent. Thereafter, a data phase will occur for that transaction, provided it had not been deferred.

The snoop results are driven by the processor bus agents during the snoop phase. Those results indicate whether the corresponding snoop request address references a valid or dirty cache line in the internal cache of a bus agent coupled to the processor bus. The dirty cache line is often referred to as a "modified" cache line. The values of HIT# and HITM# are used to indicate whether the line is valid or invalid in the addressed agent being snooped, whether the line is dirty (modified) in the caching agent, or whether the snoop phase needs to be extended. The bus agent being snooped (i.e., "caching" agent) will assert HIT# and de-assert HITM# in the snoop phase if the agent plans to retain the cache line in its cache after the snoop is completed. The caching agent will assert HITM# if its cache line is in a modified state (i.e., indicative of the caching agent containing the most recent cache line date for that address). After asserting HITM#, the caching agent will assume responsibility for writing back the modified cacheline, often referred to as "implicit write back." If the caching agent asserts HITM# and HIT# together in the snoop phase, then a snoop stall will occur so as to stretch the completion of the snoop phase for as long as needed to ensure the caching agent will eventually be ready to indicate snoop status.

If a DEFER# signal is forwarded during the snoop phase from the caching agent, hat agent will effectuate removal of that particular transaction from the in-order queue, often referred to as a "IOQ". During the response phase, responses to a DEFER# signal forwarded during the snoop phase will be indicated by one of three valid responses: deferred response, retry response, or hard error response. If a DEFER# is initiated during a snoop cycle and a response indicates either a deferred response or a retry response, it will be noted that the deferred transaction will be requested out-of-order from its original request. According to one example, the deferred request may occur subsequent to a snooping request cycle to indicate an out-of-order sequence or, alternatively, split transaction.

Most modern day processor buses rely on procedures or operations that appear somewhat atomic, in that processor buses generally retire data in the order that transactions begin. Moreover, data transfers of one transaction are often dependent upon data transfers of another transaction. For example, completion of a request from memory may require implicit write back of data from a caching agent if the request is to a modified line in that caching agent.

FIG. 1 illustrates the atomic nature of transactions and the dependency of those transactions within a pair of processor buses of a multi-processor system. For example, a first processor on a first processor bus "1" requests a transaction A on the first bus. Following transaction A, a snoop request $A_s$ will be forwarded to the second processor on the second processor bus and specifically to the cache within the second processor. Meanwhile, the second processor dispatches transaction B on the second processor bus, eventually yielding a snoop transaction $B_s$ on the first processor bus and specifically to the cache within the first processor. If both snoop requests yield a hit-to-modified signal (HITM#) being asserted, a live-lock condition may result whereby both buses are locked and unable to forward the data requested since that data is contingent upon receiving the modified cache line from the opposing bus' caching agent. More specifically, relative to the first bus, the modified data for transaction B cannot be driven on the first bus until transaction A receives its data. On the second bus, the modified data for transaction A cannot be driven on the second bus until transaction B receives its data. The pipeline transfer of responses and data is thereby maintained in a locked condition, thus preventing further transfers of data across Bus 1 and Bus 2.

It may be that in order to prevent a live-lock condition, a DEFER# signal will need to be forwarded during the snoop phase. The DEFER# signal will be forwarded across the first and second buses as $DEFER_1\#$ and $DEFER_2\#$ as shown by reference numerals 10 and 12, respectively. Asserting the defer signals whenever a hit-to-modified $HITM_x\#$ occurs on that bus (where X is either 1 or 2) will ensure that all transactions on the respective buses will be deferred. Even if a hit-to-modified signal is present on only one bus, transactions on both buses may be deferred. Even though a hit-to-modified signal occurring on both buses is relatively small, the technique of deferring transactions on both buses not only may be unnecessary, but also consumes substantial bus bandwidth since the deferred transaction must later be completed with a deferred reply.

Alternatively, the multi-processor system may utilize a central tag controller which links up all coherent transaction addresses in a tag filter to see if the remotely located processor bus agent may own the snooped address. If there is a hit to the tag filter, the snooping agent maintains ownership of its respective processor bus. This allows the local transaction to complete on the local processor bus. If the transaction on the remote bus hits a modified address noted in the tag filter, the remote processor will be required to defer its transaction. An unfortunate aspect of using tag filters, look-up tables, and various other temporary memory devices adjacent the snooping agent is the time required to access the tags and note whether or not a hit-to-modified result occurred. This implies that the HITM# signal be delayed as a result of stalling the snoop cycle until access of the tag filter has completed. As shown in FIG. 1, deferring the snoop cycle 14 and 16 one or more cycles before asserting HITM# will unfortunately delay the overall pipeline throughput on those buses.

Referring to FIG. 2, a two-transaction example is shown. Deferring the first transaction 8 may occur at the snoop phase by tagging transaction 8 and allowing the second transaction 9 to proceed as cycles 9e and 9f within respective response and data transfer phases. In this manner, priority is given to, e.g., a snoop initiated transaction on a particular bus over that of the normal request transaction which initially preceded the snoop request. The first transaction is therefore said to be deferred, whereby deferral removes transaction 8 from the IOQ by generating an appropriate response. If a tag filter is used, instead of deferring each transaction, snoop stalling may be required during the snoop phase. A snoop stall would extend the pipeline by, for example, stalling transaction 8d from its normal pipeline position at clock 10 to, for example, clock 12. This would force the second transaction at the snoop phase (cycle 9d) to also be deferred, as well as any other snoop cycles which occur later in time.

The penalty of deferring a transaction or snoop stalling cycles in the snoop phase are but two examples used to avoid live-lock conditions. Unfortunately, however, use of defer cycles and snoop stall cycles should be avoided so as to enhance the overall throughput and bandwidth of two or more processor buses within a multi-processor system. An architecture, system and method must be employed which can overcome these throughput issues while preventing the occurrence of a live-lock situation.

SUMMARY OF THE INVENTION

The problems outlined above are in large part solved by an improved architecture, system and method for reducing the need to defer or retry bus transactions in a system involving multi-processor buses. The improvement also minimizes the need to snoop stall transactions within those buses. The overall benefit is an improvement in bus throughput and overall system speed enhancement.

A guaranteed access controller is provided between the multi-processor buses. The controller includes an arbiter which maintains mastership of a first bus while guaranteeing initiation of a snoop cycle upon a second bus, both buses defined as those which couple to separate processors or processor clusters within a multi-processor computer system. The access is maintained so that only one transaction within the pair of buses is deferred. The other transaction is assured to continue in-order, thereby preventing a split transaction on that bus. For example, if the first bus employs transactions which occur in order (i.e., not taken out of the IOQ) and are not split, throughput on that bus is enhanced. Of benefit is the avoidance of deferring transactions on both buses whenever a hit-to-modified signal occurs. Even under conditions of a hit-to-modified signal, a transaction within one bus is assured of completing in-order (i.e., without implementing a deferral of that transaction).

According to one embodiment, the control logic and/or arbiter is maintained within a bus interface unit. The bus interface unit is linked between two or more processor buses. Each bus may have a single processor or a cluster of processors linked thereto. The arbiter may be coupled to allow completion of a first transaction within the first bus and also to initiate a snoop request cycle to a modified cache line within a first bus agent coupled to the first bus before granting mastership to the second bus. The snoop request cycle may originate from the bus interface unit or from a second bus agent coupled to the second bus. Preferably, the processor bus agent (i.e., the first and second bus agents in the example provided) each comprise memory. The memory can be cache memory configured to store cachelines of data. The bus interface unit and, more particularly, the processor or cluster control logic of the bus interface unit, may be granted mastership of the second bus after completion of the first transaction and initiation of the snoop request cycle in order for the bus interface unit to initiate another snoop request cycle to a modified cacheline within the second bus agent.

According to another embodiment, the bus interface unit may comprise a first bus controller and a second bus controller. The first bus controller is coupled to receive a first request across a first bus from a first bus agent, whereas the second bus controller may be coupled to receive a second request across a second bus from a second bus agent. The first request is preferably to a modified cache line within the second bus agent, while the second request is preferably to a modified cache line within the first bus agent. The arbiter may be coupled to the first bus controller and the second bus controller to allow completion of a transaction originating from the first request, and to allow completion of a snoop request cycle originating from the second bus agent before granting mastership to the second bus.

The arbiter may include a state machine which gives priority of mastership to the first bus over that of the second bus. The priority can be either fixed or can change. If the priority changes, the algorithm used to change that priority can include, for example, a round-robin scheme.

According to yet another embodiment, a computer may be provided. The computer includes an arbiter coupled to maintain mastership of the first bus such that the first bus can complete a response to the first request and can complete a snoop request issued from a second bus agent to the cache memory of the first bus agent for allowing the second request to be issued across the second bus. A peripheral device may be included with the computer. The peripheral device is adapted for communication with the first and second buses, and is coupled upon a printed circuit board separate from another printed circuit board upon which the arbiter and/or processor is coupled. The arbiter may issue the snoop request across the first bus to the cache memory of the first bus agent before a snoop request is issued across the second bus to the cache memory of the second bus agent. The arbiter may issue a defer signal to the second bus agent to defer the second request across the second bus such that the second request is serviced after a snoop request is issued across the second bus. The peripheral device can include any device connected to a peripheral bus separate and distinct from the processor bus. Examples of such peripheral devices include a hard drive controller, a keyboard controller, a display controller, or a printer controller. The hard drive controller, keyboard controller, display controller, and printer controller operably links the peripheral bus and signals therein to respective mass storage devices, a keyboard, a display, and a printer.

According to another embodiment, a computer is provided having a peripheral controller means arranged upon a first printed circuit board. A first and second bus agent means are coupled to a second printed circuit board separate from the first printed circuit board and further coupled to respective first and second buses. Means are provided for granting mastership of the first bus to allow a transaction from the first bus agent and the snooping cycle to occur across the first bus before granting mastership to the second bus.

According to yet another embodiment, a method is provided for orchestrating transactions across a bus within a multi-processor system. The method includes dispatching a request cycle from a first bus agent across the first bus to a modified address within a second bus agent. Thereafter, a request cycle from the second bus agent across a second bus is deferred. The deferred request cycle is preferably one which addresses a modified address within the first bus agent. A first snoop cycle dispatched across the first bus to the first bus agent is serviced before retrying the deferred request cycle.

BRIEF DESCRIPTION OF THE DRAWINGS

Other objects and advantages of the invention will become apparent upon reading the following detailed description and upon reference to the accompanying drawings in which.

Figure 1:
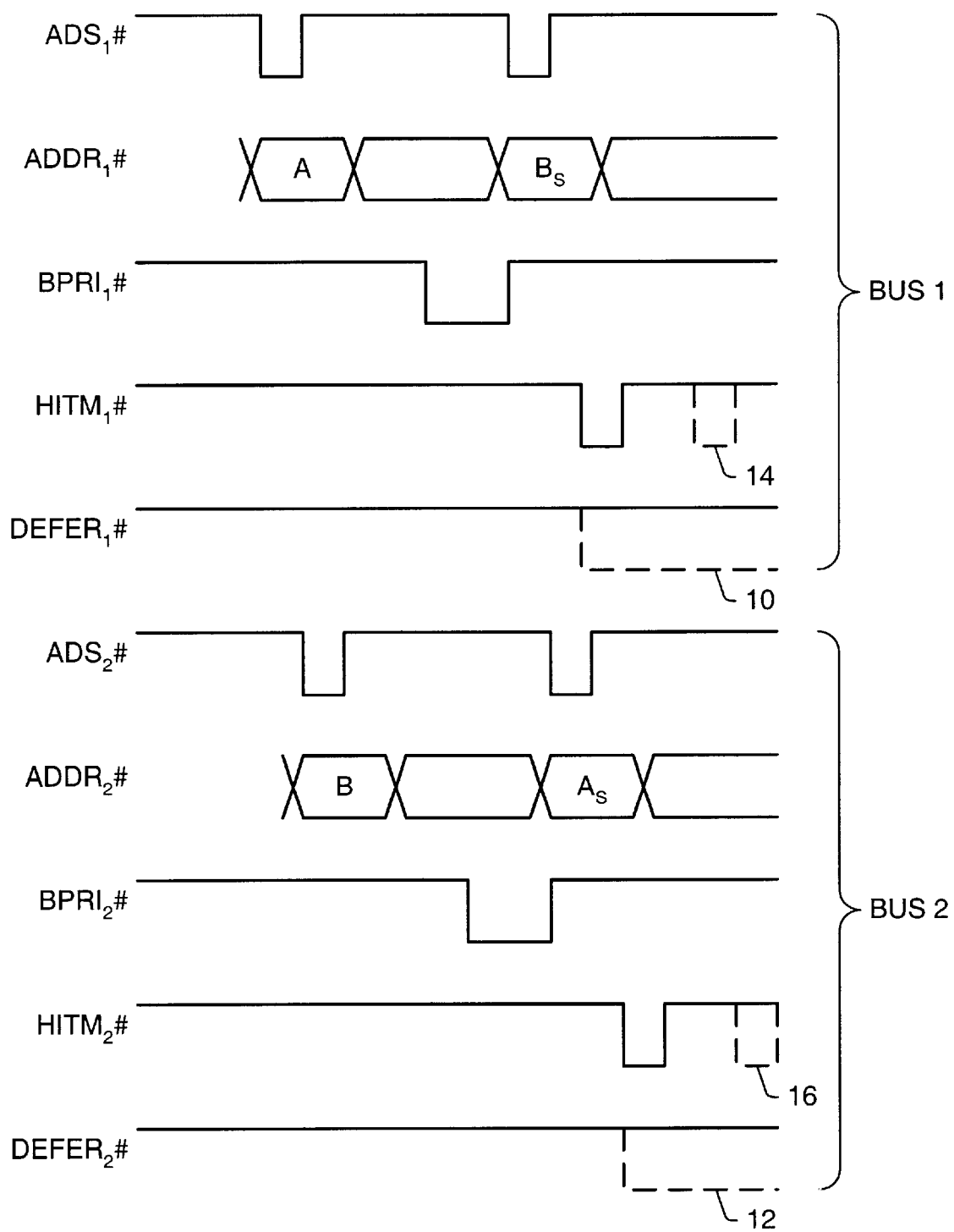
FIG. 1 is a timing diagram of a normal request on a first bus and associated snoop transaction on a second bus contending with a normal request on a second bus and associated snoop transaction on the first bus, when one or both snoop transactions produce a hit modified signal.
Figure 2:
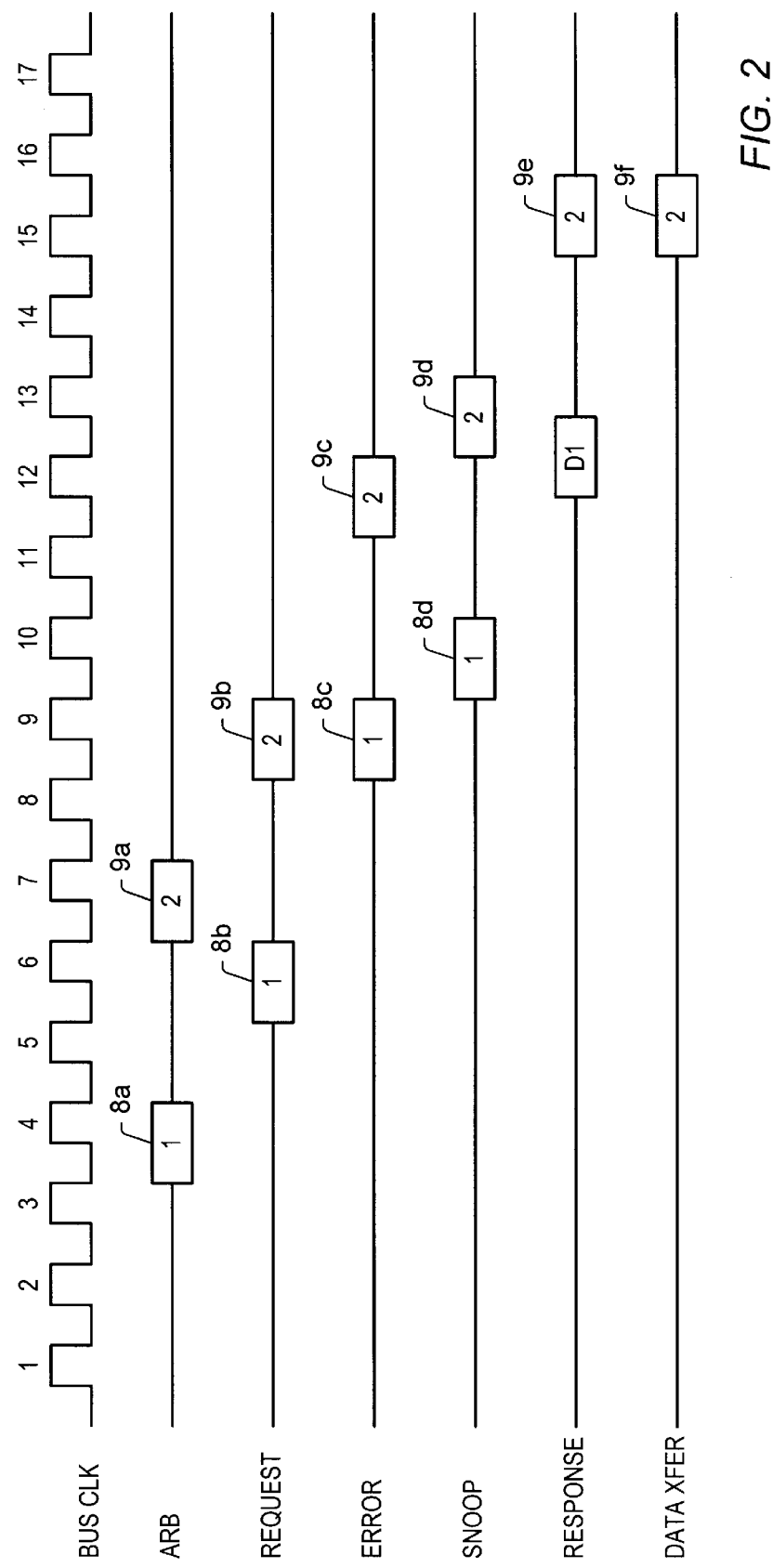
FIG. 2 is a timing diagram of transactions pipelined through transaction phases of a processor bus.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 3:
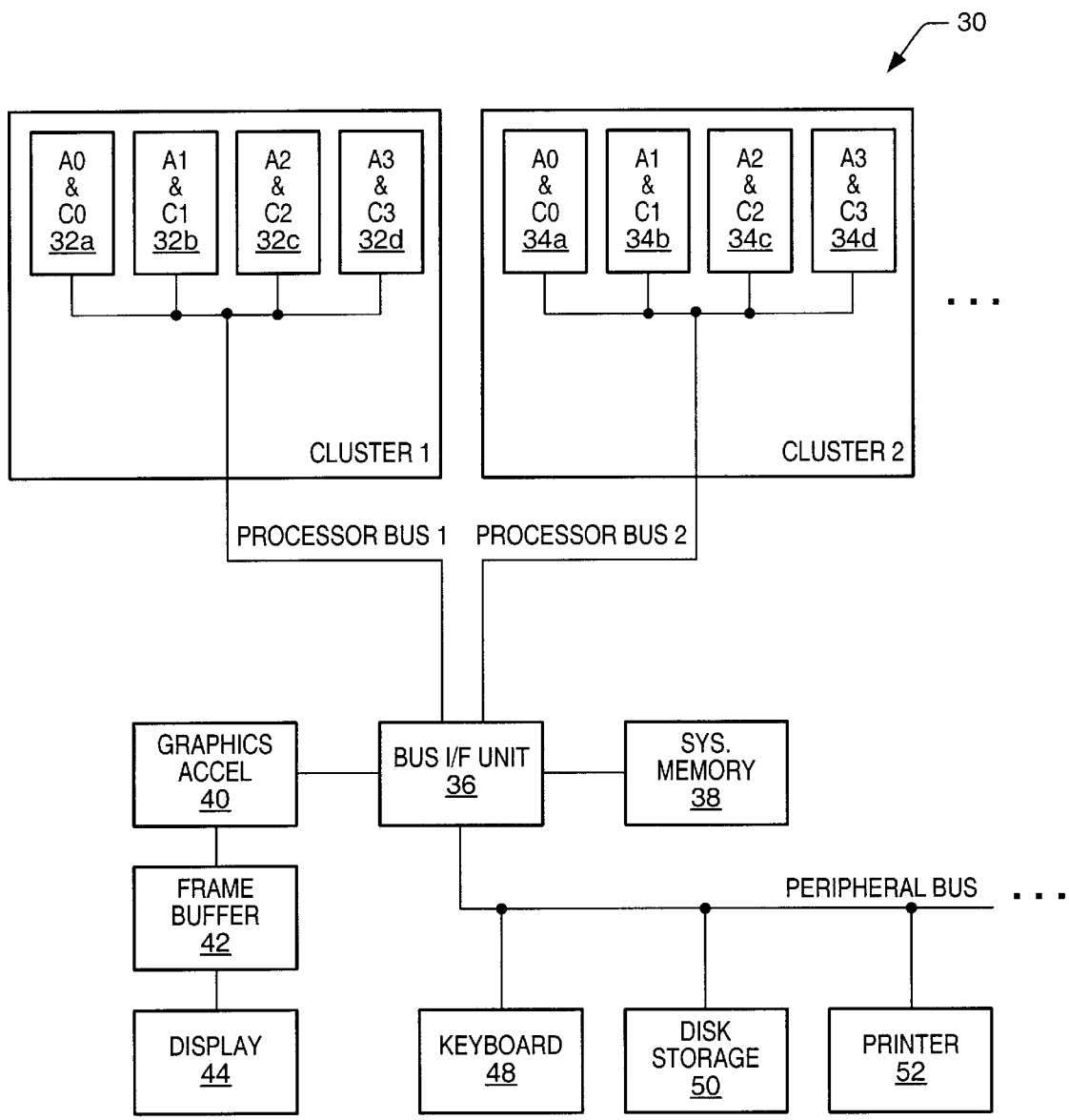
FIG. 3 is a block diagram of an architecture illustrative of processors and associated caches arranged within bus clusters and coupled to peripheral devices via a bus interface unit.

Turning to the drawings, FIG. 3 illustrates a computer system 30. The computer system 30 includes two or more clusters of processors, each of which are denoted as a processor bus agent "A" with associated cache memory "C," denoted as reference numerals 32 and 34. Each cluster may be serviced by a processor bus, separate from processor buses which service other clusters. Computer system 30 is thereby a multi-cluster, multi-processor bus architecture for use in a local or distributed system.

Coupled to each processor bus is a bus interface unit 36. The bus interface unit provides connectivity between the processor buses, as well as between the processor buses and a peripheral bus. Bus interface unit 36 may therefore operate to link buses within a hierarchical bus architecture, by coupling data, addressing and control signals forwarded between processor buses, as well as between the processor buses and the slower PCI/ISA/EISA bus, system memory bus and graphics (e.g., AGP) bus. Within bus interface unit 36 may be a system memory controller which links the system memory bus and system memory 38 to signals forwarded from the processors and/or peripheral devices. System memory 38 comprises a large contiguous block of memory configured as DRAM or SDRAM, otherwise known as "semiconductor memory." Bus interface unit 36 may also include a graphics port, such as AGP, which communicates to a graphics accelerator 40. AGP provides high performance, component level interconnect targeted at three-dimensional graphics display applications based on performance extensions or enhancements to PCI. A frame buffer 42 is a local graphics memory and operates as a buffer which can capture a frame of memory, defined as a still picture. Display 44 is an electronic display upon which an image or text can be presented. A suitable display includes a cathode ray tube or liquid crystal display, etc.

Bus interface unit 36 may be considered a chipset, or application specific chipset that provides connectivity to various buses, and integrates other system functions such as memory interface and P1394. System memory 38 may be considered the main memory and refers to a portion of the addressable memory that the majority of memory accesses target. Thus, system memory 38 is considered the largest continuous memory space of system 30.

Bus interface unit 36 may be embodied on a single integrated circuit, or multiple integrated circuits. Connected to one or more of those circuits is a peripheral bus, such as a PCI bus, an ISA bus, and/or an EISA bus, etc. The peripheral bus allows connection between a keyboard controller, a mass storage controller, or disk storage controller, a printer controller, etc., all of which are known as subsystems linked upon a bus separate from the processor bus. The keyboard controller can form a portion of keyboard 48, while the disk drive controller can form a portion of the disk storage device 50. The printer controller can form a portion of printer 52, and so forth for each of the various peripheral devices. Importantly, the peripheral devices are configured separate from the processors or integrated circuits which form the bus interface unit 36. Those peripheral devices and, specifically, the controllers which control those devices are mechanically separate from, and may be embodied at least partially upon, a printed circuit board separate from a printed circuit board on which the chip or chipset of bus interface 36 is configured. Accordingly, the peripheral devices are known to be separate from a motherboard which may embody processors 32 and 34, and preferably separate from another printed circuit board which may partially embody bus interface unit 36.

Figure 4:
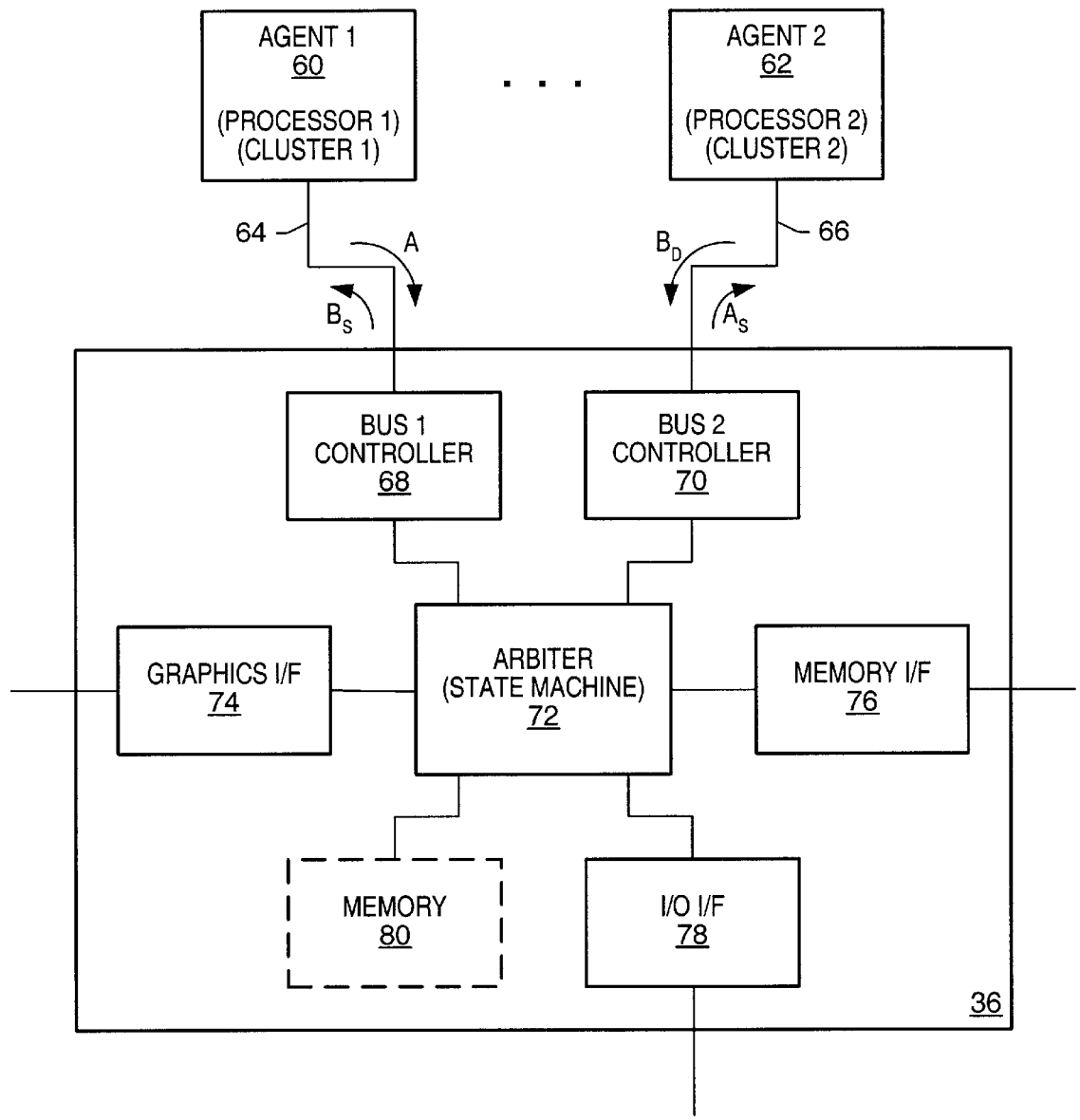
FIG. 4 is a block diagram of a bus interface unit comprising an arbitration unit, or arbiter, for orchestrating request and snoop cycles upon buses of a multi-processor or multi-cluster system.

FIG. 4 illustrates a simplified version of a first and second bus agent 60 and 62. Each agent may either be a processor or a cluster of processors linked to a respective processor bus. Of course, it is known that more than two bus agents may be employed in a multi-processor system. However, for sake of brevity and clarity in the drawings, only two bus agents are shown, each coupled to respective first and second processor buses.

The first processor bus is denoted as reference numeral 64, while the second processor bus is denoted as referenced numeral 66. First bus 64 operably links first bus agent 60 with a first bus controller 68, while the second bus 66 operably links the second bus agent 62 with a second bus controller 70. Controllers 68 and 70 can be considered as part of bus interface unit 36, relative to each respective bus or cluster within the multi-processor system, and mastership of the corresponding buses are controlled by an arbiter 72. Among its many functions, arbiter 72 orchestrates transfer of control, address and data signals between buses linked to the various subsystems within bus interface unit 36. In the example provided, arbiter 72 provides an interface not only between the bus controllers, but also between the graphics interface, memory interface and input/output interface, shown respectively as reference numerals 74, 76 and 78. Graphics interface 74 connects to the graphics accelerator 40 (FIG. 3), while memory interface 76 connects to a memory controller or system memory 38 (FIG. 3). Input/output interface 78 connects to a peripheral bus (FIG. 3).

Arbiter 72 may include both combinatorial and sequential logic. Sequential logic may operate as a state machine to control various times in which the processor bus agents 60, 62, 68 and 70 are granted mastership of their respective buses. According to one embodiment, the state machine within arbiter 72 ensures that when multiple bus agents 60 and 62 arbitrate for their respective buses, guaranteed access is given to the first bus agent requesting mastership. Thus, if the bus agent is associated with the first bus, mastership is maintained on the first processor bus such that, for example, transaction A can be run without ordering requirements relative to any outstanding transactions on the second processor bus. The state machine within arbiter 72 thereby assures access grant is given for a particular transaction A on the first bus 64, and also ensures that a snoop transaction $A_s$ can occur on the second processor bus 66, or any the other remote processor buses or processor bus segments, and that return data $B_s$ from the second processor bus 66 across the first processor bus on a hit-to-modified condition will occur without requiring the first processor 60 on processor bus 64 from needing to defer or retry transaction A for which guaranteed access was granted. Accordingly, deferral is not needed on all transactions when a hit-to-modified condition occurs on those transactions.

A tag filter contained within memory 80 may be employed as an option. Memory 80 may contain a memory range of tag information as to certain locations, and each of the locations within the tag may represent an equal portion of memory. Each tag location can be set to be either an invalid, shared or modified tag. Within the memory range of the tag memory 80, a first processor cache may not own any of the tag portion, and therefore is invalid, it has some of it but it is shared, or it has it in modified. The other processor, or second processor, may do a read transaction and wants to read a location within the memory range. By looking in the tag memory 80, the second processor can determine whether it is to do a snoop to the other processor's cache or not. The second processor thereby looks up the memory location in the tag memory range to determine if, for example, it is invalid thereby the second processor simply gets the information directly from system memory. Thus, if the second processor does a read cycle, and the tag information within memory 80 shows that the read address is not owned on the first processor cache, then it is known that the second processor does not need access to the first processor cache. The transactions can thereby maintain order (i.e., are not split) without having to do atomic transactions for the first processor bus. If transaction A does not require an atomic operation, then transaction B can get the atomic operation. In other words, if transaction B is not to a hit-to-modified location, as indicated by tag memory 80 status, then ownership can be granted to transaction B without deferring transaction B.

Figure 5:
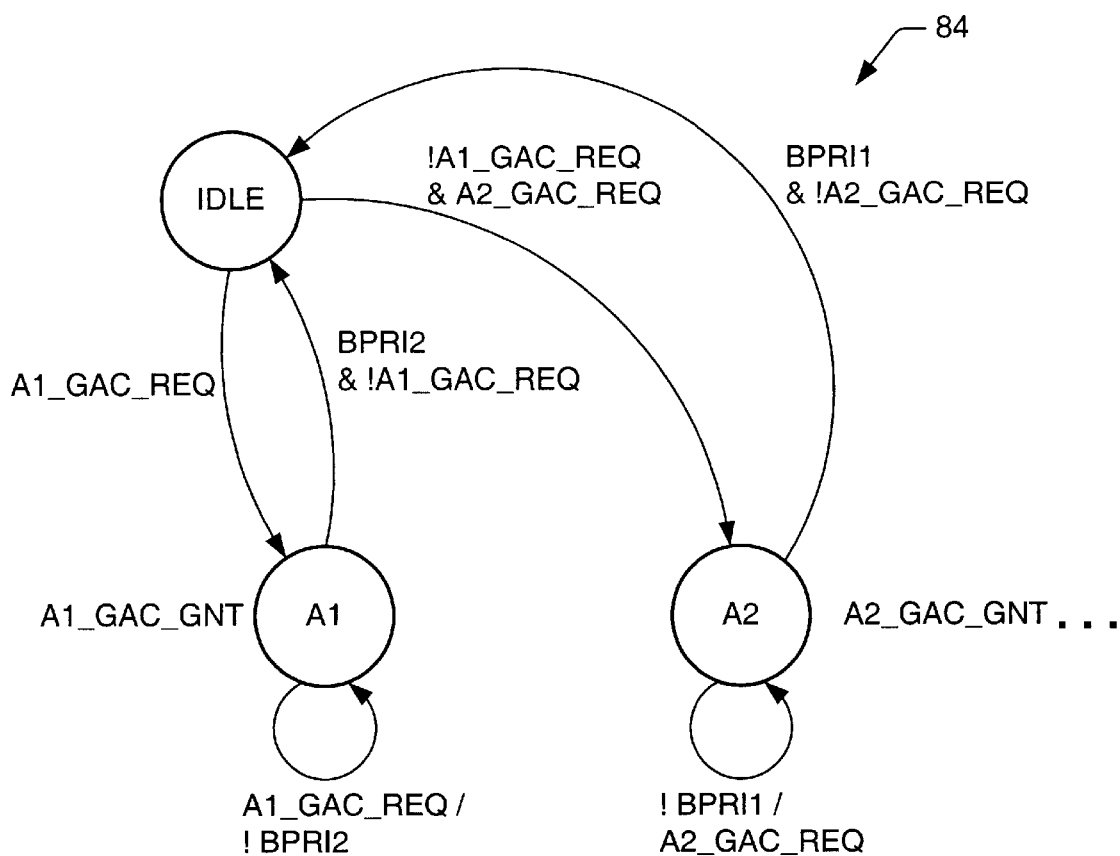
FIG. 5 is a state diagram of the state machine used to control the arbiter of FIG. 4.

FIG. 5 illustrates in more detail a state diagram 84 within arbiter 72. In particular, state machine 84 illustrates three states, according to one example. Depending on the number of processor buses, the number of states will vary. In the example shown, only two processor buses and therefore only two guaranteed access grant states A1 and A2 are shown. Grant state A1 indicates a state in which a bus agent upon the first processor bus in granted a guaranteed access to that bus. Grant occurs from an idle state upon the first processor bus agent issuing a request signal and thereafter receiving a grant signal, shown in FIG. 5 as A1_GAC_REQ, followed by A1_GAC_GNT. The grant or acknowledge state of A1 is maintained for all subsequent requests A1_GAC_REQ by the first processor bus agent A1 or if arbitration for the second processor bus is not instituted (!BPRI2). Thus, as long as requests continue on the first processor bus, or arbitration is not solicited for the second processor bus, state A1 will be maintained. However, if the first processor bus requests no longer continue (!A1_GAC_REQ) and arbitration for the second processor bus (BPRI2) is asserted, then transition from state A1 to idle will occur. If a request of the second processor bus and not the first processor bus occurs, then transition will occur to state A2, as shown. State A2 will be maintained provided either requests to the second processor occur (A2_GAC_REQ) or arbitration for the first processor bus is not asserted (!BPRI1). State A2 is therefore deemed a second processor bus grant state, similar to state A1 being the first processor bus grant state. Numerous other grant states are available depending on the number of processor buses used. Grant state A2 will be maintained unless arbitration for the first processor bus ensues (BPRI1) and requests for the second processor bus does not occur (!A1_GAC_REQ).

FIG. 5 illustrates a fixed or variable priority scheme, whereby priority is granted to state A1 instead of A2 if both agent A1 on the first processor bus and agent A2 on the second processor bus solicit mastership. The priority can be changed by substituting A1 for A2, and so forth in a round-robin arbitration scheme, if desired. Therefore, the arbitration scheme can be fixed or variable depending on the design factors needed.

Figure 6:
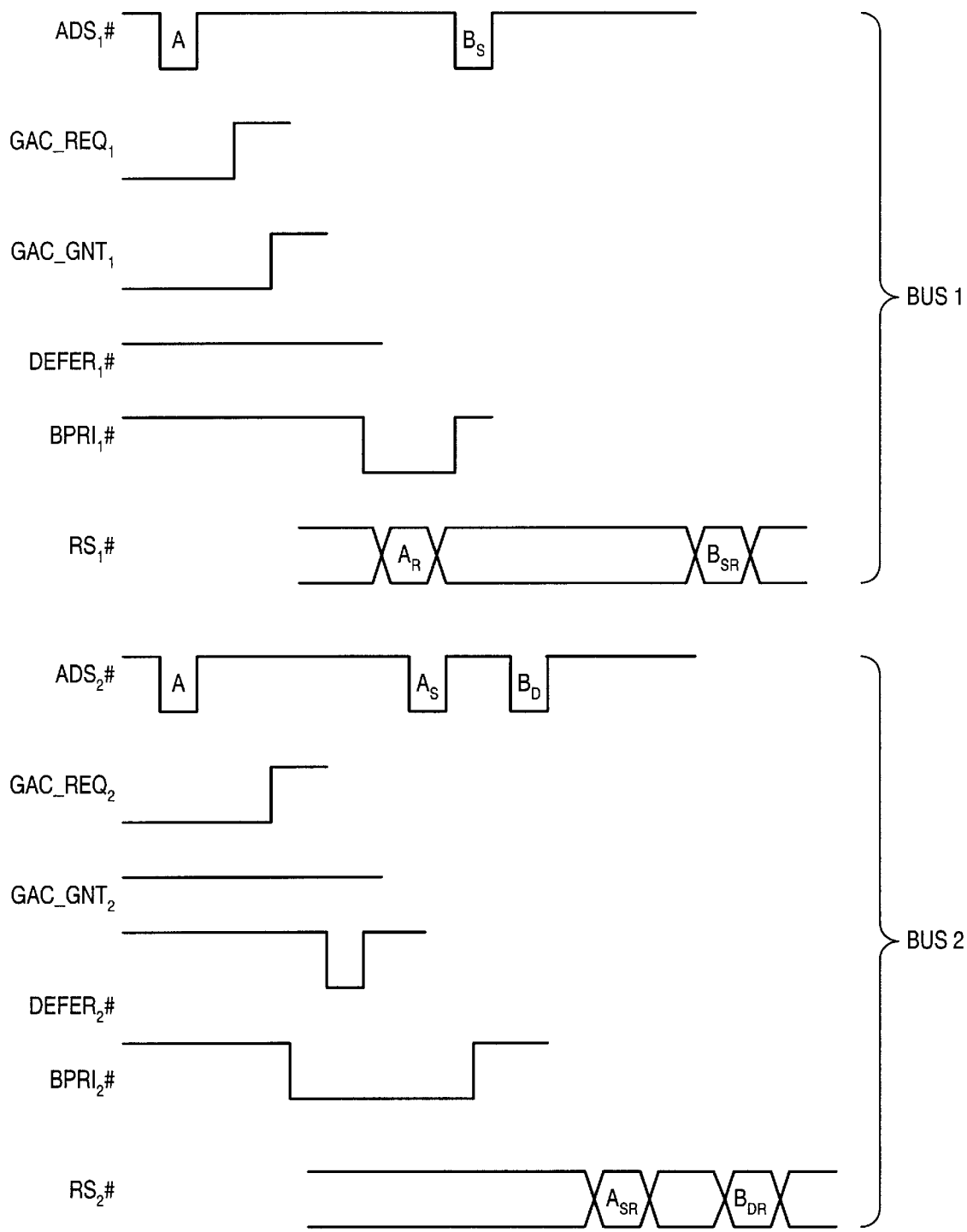
FIG. 6 is a timing diagram of guaranteed access, and guaranteed in-order completion of a transaction within one bus, while a deferred transaction occurs on other buses of a multi-processor or multi-cluster system such that cache coherency is maintained even though each transaction may produce a signal indicative of hit-to-modified cache line within an agent on the opposing bus.

FIG. 6 illustrates a timing diagram of the various transactions A, B, $B_s$, $A_s$, etc. partially shown in FIG. 4. Specifically, the first processor bus, labeled BUS 1, and the second processor bus, labeled BUS 2, have various signals sent across those buses according to the various phases and timed sequences of those phases. In the example shown, transaction A is initiated during a request phase by asserting an address within that phase. Slightly after transaction A request, transaction B is requested on BUS 2. even if both requests are to a modified cache location in the opposing bus agent, the initial request of transaction A will be serviced by an acknowledge or grant assertion (GAC_GNT$_1$). Since request for transaction B occurred subsequent to transaction A, guaranteed access grant will not occur on the second bus, thereby ensuring that accesses within the first bus will occur before accesses within the second bus. Those accesses, as the name implies, are guaranteed accesses within the first bus. Accordingly, when the snoop phase occurs, the DEFER$_1$# will not be asserted and transaction A (and related transactions) will proceed in the order in which they are dispatched or requested. Subsequently, the snoop request to the cache of the first processor bus agent will be asserted, as shown by BPRI$_1$# so as to allow the pipelined initiation of the snoop request $B_s$ originating from the second processor bus agent. Accordingly, the response phase yields an in-order sequence of transactions beginning with transaction A response ($A_R$) followed by the snoop request response of transaction B ($B_{SR}$)

In the example shown, and contrary to BUS 1, BUS 2 undergoes a defer operation, noted by the BUS 2 grant signal not being asserted and the DEFER$_2$# signal being asserted. Resulting from this combination, transaction B, upon arriving on the snoop phase, will be deferred so that it does not extend into the data phase. Instead, the response phase (RS$_2$#) indicates a deferred response for transaction B. The deferred response is not shown, however, the deferred transaction ($B_{DR}$) is shown as being deferred after the snoop request response ($A_{SR}$) Accordingly, the snoop request from the opposing processor bus is allowed to proceed, while the initial bus transaction B on the same processor bus is deferred. This ensures that the needed data from the opposing processor ($A_s$) will be presented to that opposing processor bus so that transaction A can be completed with its associated snoop data appropriately forwarded for that transaction. This will then allow transactions on BUS 2 to complete. Importantly, all deferred cycles can then be completed on the second processor bus by strobing those cycles through the various phases while maintaining BPRI$_2$# asserted. As such, the deferred reply cycles can commence once BPRI$_2$# is asserted and the first processor bus no longer is granted access. The deferred reply can commence as soon as possible for any transaction that was deferred, but for which snoop cycles have already been done on the opposing processor bus.

It will be appreciated to those skilled in the art having the benefit of this disclosure that the various embodiments herein are believed to be capable of performing efficient transfers of data across multiple processor buses in a multi-processor computer system. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A bus interface unit coupled between a first bus and a second bus, said bus interface unit comprising an arbiter coupled to allow completion of a first transaction within the first bus and initiation of a snoop request cycle to a modified cache line within a first bus agent coupled to the first bus before granting mastership to the second bus.

2. The bus interface unit as recited in claim 1, wherein the first and second buses each comprise a processor bus.

3. The bus interface unit as recited in claim 1, wherein the snoop request cycle originates from the bus interface unit, or a second bus agent coupled to the second bus.

4. The bus interface unit as recited in claim 3, wherein the first and second bus agents each comprise cache memory.

5. The bus interface unit as recited in claim 1, wherein the bus interface unit is granted mastership of the second bus after completion of the first transaction and initiation of the snoop request cycle in order for the bus interface unit to initiate another snoop request cycle to a modified cache line within the second bus agent.

6. A bus interface unit, comprising:
a first bus controller coupled to receive a first request (A) across a first bus from a first bus agent;
a second bus controller coupled to receive a second request (B) across a second bus from a second bus agent, wherein the first request is to a modified cache line within the second bus agent, and wherein the second request is to a modified cache line within the first bus agent; and
an arbiter coupled to the first bus controller and the second bus controller to allow completion of a transaction originating from the first request and to allow completion of a snoop request cycle originating from the second bus agent before granting mastership to the second bus.

7. The bus interface unit as recited in claim 6, wherein the arbiter comprises a state machine which gives priority of mastership to the first bus over that of the second bus.

8. The bus interface unit as recited in claim 7, wherein said priority is fixed.

9. The bus interface unit as recited in claim 7, wherein said priority changes.

10. A computer, comprising:
a first bus coupled to receive a first request from a first bus agent coupled to the first bus;
a second bus coupled to receive a second request from a second bus agent coupled to the second bus;
wherein the first request is to a modified address within a cache memory of the second bus agent, and wherein the second request is to a modified address within a cache memory of the first bus agent;
an arbiter coupled to maintain mastership of the first bus such that the first bus can complete a response to the first request and can complete a snoop request issued from the second bus agent to the cache memory of the first bus agent before allowing the second request to be issued across the second bus; and
a peripheral device adapted for communication with the first and second buses, and coupled upon a printed circuit board separate from another printed circuit board upon which the arbiter is coupled.

11. The computer as recited in claim 10, wherein said arbiter issues the snoop request across the first bus to the cache memory of the first bus agent before a snoop request is issued across the second bus to the cache memory of the second bus agent.

12. The computer as recited in claim 10, wherein said arbiter issues a defer signal to the second bus agent to defer the second request across the second bus such that the second request is serviced after a snoop request is issued across the second bus.

13. The computer as recited in claim 10, wherein the peripheral device comprises a hard drive controller, a keyboard controller or a printer controller.

14. The computer as recited in claim 10, wherein the peripheral device comprises a frame buffer or a display controller.

15. A computer comprising:

a peripheral controller means arranged upon a first printed circuit board;

a first and second bus agent means coupled to a second printed circuit board separate from the first printed circuit board and further coupled to respective first and second buses; and means for granting mastership of the first bus to allow a transaction from the first bus agent and a snooping cycle to occur across the first bus before granting mastership to the second bus.

16. The computer as recited in claim 15, wherein said granting means comprises means for deferring a transaction dispatched from the second bus agent across the second bus until after mastership of the first bus has been released.

17. The computer as recited in claim 15, wherein said granting means comprises means for deferring a transaction dispatched from the second bus agent across the second bus until after a snoop request cycle issued from the snooping agent has completed.

18. A method for orchestrating transactions upon a bus within a multi-processor system, the method comprising:

dispatching a request cycle from a first bus agent across a first bus to a modified address within a second bus agent;

deferring a request cycle from the second bus agent across a second bus to a modified address within the first bus agent; and servicing a first snoop cycle dispatched across the first bus to the first bus agent before retrying the deferred request cycle.

19. The method as recited in claim 18, further comprising retrying the deferred request cycle across the second bus after a second snoop cycle is dispatched across the second bus to the second bus agent.

* * * * *